Jan. 1, 1946. H. CRUZAN 2,392,213
BY-PASS CONTROL VALVE
Filed June 3, 1942
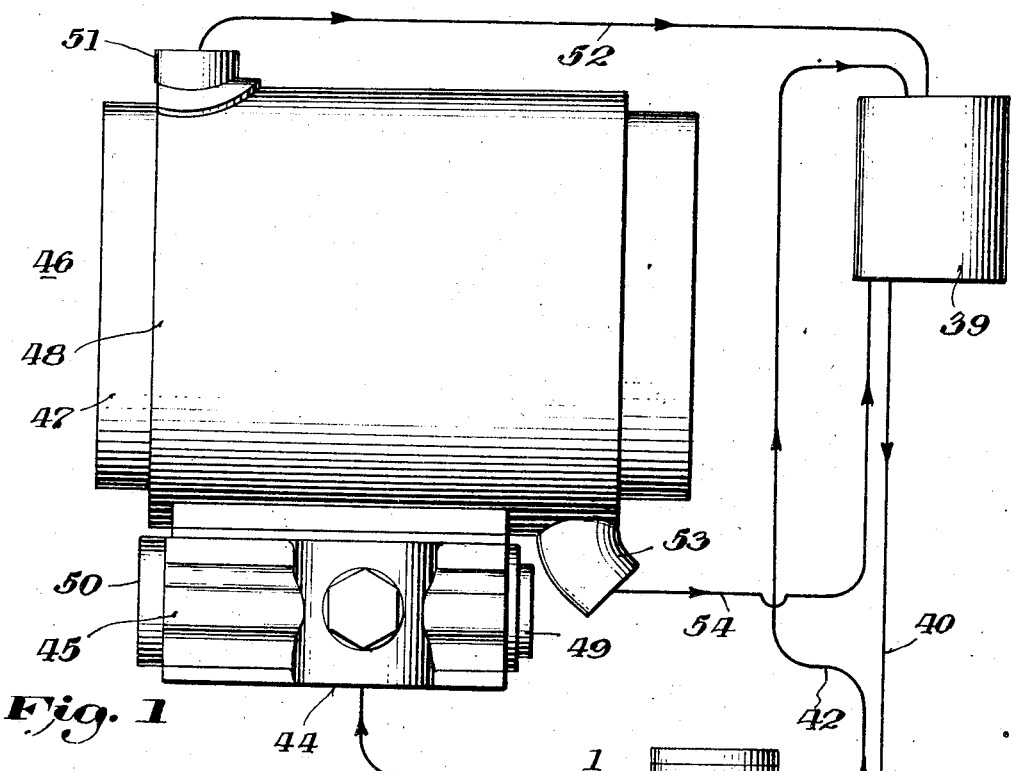
Fig. 1
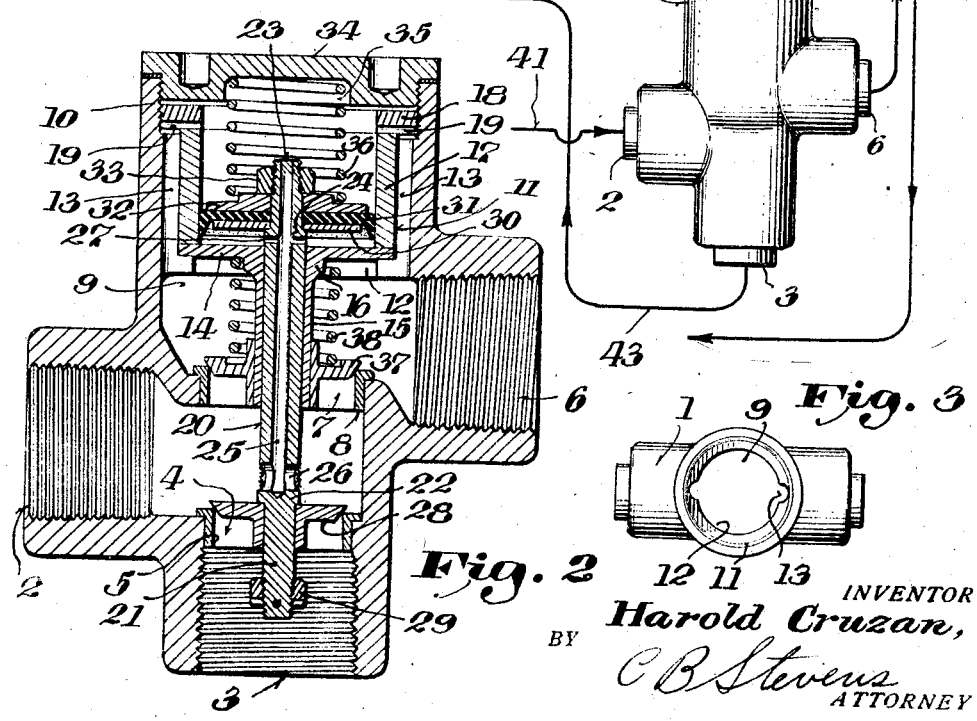
Fig. 2
Fig. 3
INVENTOR
Harold Cruzan,
BY C B Stevens
ATTORNEY Patented Jan. 1, 1946

2,392,213

UNITED STATES PATENT OFFICE 2,392,213

BY-PASS CONTROL VALVE

Harold Cruzan, Dayton, Ohio, assignor to United Aircraft Products, Inc., Dayton, Ohio, a corporation of Ohio Application June 3, 1942, Serial No. 445,601

20 Claims. (Cl. 137—153)

This invention relates to a by-pass or fluid flow control valve, and pertains more particularly to a device for controlling surge pressure in a fluid circulatory system, wherein a lubricant is circulated under pressure through a heat exchanger or temperature and viscosity conditioning unit by a pump or analogous pressure producing means.

While the control valve is hereinafter shown and described as being applied to a lubricant circulating and conditioning system of an airplane engine it will be readily apparent and understood that same is not restricted to such use, but is equally applicable to any power units when used in connection with a fluid circulatory system wherein a similar problem is involved.

The lubricant circulating and conditioning systems in use with airplane engines at the present time, generally include a pressure pump disposed in the line leading from an oil reservoir to the engine and a scavenge pump and heat exchange unit in the return line from the engine back to the reservoir. The scavenge pump is located ahead of the heat exchange unit so that the latter functions to control the temperature and thereby the viscosity of the oil being returned to the reservoir and thence to the engine.

Ordinarily, when the engine is initially started the lubricant in the various conduits and heat exchange unit is usually more viscous than desired for efficient operation of the lubrication system. Consequently, high pressure is needed to force the lubricant through the flow lines and heat exchange unit to the vital parts of the engine which require uniform and constant lubrication. Thus it will be appreciated that, under the foregoing conditions, an almost instantaneous high pressure on the oil lines and heat exchange unit will result immediately upon starting the engine and scavenge pump with consequent damage to the system and heat exchange unit by bulging or collapsing the shell and/or tubes of the latter or rupturing the lines.

Therefore, the primary important object of this invention is to provide a device of the above character which will entirely eliminate the possibility of excessive or surge pressure, generated by the scavenge pump, being exerted on the heat exchange unit so as to protect the latter from damage which may result therefrom.

Another important object of this invention is to provide an automatic valve of the above character which will prevent damage to the lubricating system resulting from excessive pressure built up by the scavenge pump under actual flight conditions, for example in situations where the motor and thereby the lubricating system are temporarily cut out and then restarted at high altitudes or in power dives, such conditions usually resulting in rapidly increasing the viscosity of the lubricant, and in some instances congealing the latter.

Another important object of this invention is to provide a control of the above character which will automatically function to by-pass the lubricant around the heat exchange unit directly to the reservoir in the event the viscosity of the lubricant is such that the lubricant will not readily flow through the heat exchange unit under the normal pressure generated by the scavenge pump.

Another important object of this invention is to provide a control valve of the above character which will automatically function to by-pass the lubricant around the heat exchange unit to the reservoir in the event that the flow is prevented by an obstruction in the heat exchange unit of the circulatory system.

A still further important object of this invention is to provide a by-pass control valve which is of simple construction, efficient in operation and one which may be readily manufactured and placed upon the market at a reasonable cost.

The foregoing and other important objects and advantages will be readily apparent throughout the course of the following detailed description and drawing, wherein like reference characters indicate like parts, and in which:

Figure 1 is a diagrammatic disclosure of one type of lubrication system with the by-pass control valve forming the subject matter of this application installed therein, and with the engine and pumps removed, Figure 2 is a vertical cross-section of the by-pass control valve shown in elevation in Figure 1, and Figure 3, is a top plan view of the control valve on a reduced scale, with the closure and valve mechanism removed.

Referring in detail to the by-pass control valve, 1 indicates a hollow body or casing of substantially cruciform configuration, provided with an inlet port 2 and a main outlet port 3 connected by a right-angled passage 4 having a valve seat 5 therein. The body 1 is also provided with a by-pass outlet port 6 connected with the inlet port 2 by a passage 7 having a valve seat 8 therein disposed in vertical alinement with the valve seat 5.

The hollow body 1 is further formed with a vertically extending branch passage 9 in vertical alinement with the valve seats 5 and 8 and has its open upper end internally threaded as at 10.

The passage 9 above the by-pass outlet 6 is reduced as at 11 and such reduced portion is formed at its lower end with an inwardly extending flange 12. The reduced portion and the flange is further formed with diametrically opposed and vertically extending grooves 13 to provide a pair of fluid flow passages.

Disposed within the reduced portion 11 and engaging the flange 12, so as to be supported thereby, is a disk 14 having a central opening therethrough. Formed integral with the disk and depending therefrom in axial alinement with the central opening, is a sleeve 15, the inner and outer surfaces of which provide bearings or guides. The lower free end of the sleeve 15 extends through and terminates at the lower edge of the valve seat 8. Adjacent its upper end at the point of connection with the disk 14, the sleeve 15 is formed with an enlargement or collar 16.

Fitting snugly within the reduced portion 11, is a cylinder 17 which has its lower end seated upon the disk 14 and its upper end terminating substantially flush with the upper end of said reduced portion, the disk forming a bottom for the cylinder.

A locking ring 18 is threaded into the upper end of the branch passage 9 and has its lower face engaging the upper end of the cylinder 17 so as to securely hold the disk 14 upon the flange 12. The lower face of the locking ring 18 is provided with a pair of opposed radially extending and downwardly facing grooves 19 to provide horizontal fluid passages connecting the fluid passages 13 with the interior of the cylinder 17.

Slidably mounted within the sleeve 15 is a stem or rod 20 having a reduced lower end 21 providing a shoulder 22 and a reduced upper end 23 providing a shoulder 24.

The rod 20, between the shouldered portions 22 and 24, is formed with an axially extending passage or friction tube 25, which latter communicates at its lower end with an enlarged transverse screened passage 26 opening into the inlet passage of the valve body while its upper end communicates with a smaller transverse passage 27 opening into the cylinder 17.

Slidably mounted upon the reduced lower end of the rod 20 is a valve 28 which is adapted to engage the seat 5 during certain phases of the operation of the device. The valve 28 is retained against vertical separation from the rod 20 by means of a threaded nut 29, or other suitable fastening means, which also acts to engage and thereby unseat or open valve 28, as will be later described.

Mounted upon the reduced upper end of the rod 20 for reciprocatory movement within the cylinder 17, is a piston head composed of a lower plate 30, an intermediate cup type packing 31, and an upper plate 32, all of which elements are clamped together against the shoulder 24 by means of a nut 33 having threaded engagement with the upper end of said rod.

The upper end of the vertically extending branch passage 9 is sealed by means of a removable cap or closure 34 formed with a downwardly facing recess 35.

A compression spring 36 is disposed between the closure 34 and the upper plate 32 of the piston head with its lower end bearing against the latter and with its upper end seated within and bearing against the top wall of the recess 35, so as to be centered thereby.

The depending sleeve 15 has a valve 37 slidably mounted thereon and is normally held upon its seat 8 by means of a compression spring 38 disposed between the valve 37 and disk 14 and centered by the collar 16, the compression value of the spring 38 being in excess of that possessed by the spring 36.

The lower valve 28 is normally held upon its seat 5 by means of the spring 36 acting through the piston head, rod 20 and shoulder 22. However, the pressure of the spring 36 is further periodically augmented by fluid pressure acting against the top of the piston head, such fluid pressure being by-passed from the outlet side of the valve 37 through the passages 13 and 19 into the top of the cylinder 17, as well as by the inlet fluid pressure on top of the valve 28.

Referring to the diagrammatic disclosure of Fig. 1, 39 indicates a lubricant or oil reservoir having communication through conduit 40 with a pressure pump and engine respectively, not shown. The oil after leaving the engine is then forced by a scavenge pump not shown, through conduit 41 into the inlet 2 of by-pass control valve body 1.

The by-pass outlet 6 of the valve body 1 is connected to reservoir 39 by conduit 42, while the main outlet port 3 is connected by conduit 43 with the inlet passage 44 of an oil viscosity controlled member 45 carried by an oil heat exchange unit indicated generally at 46. The oil heat exchange unit is provided with a radiator 47 surrounded by a warming jacket 48.

The inlet passage 44 of the viscosity controlled member 45 leads to each of a pair of pressure valves 49 and 50 which control the inlet of oil to the warming jacket and radiator respectively, depending upon the viscosity of the oil in the radiator 47.

The radiator 47 is provided with an outlet 51 connected to the reservoir by conduit 52, while the outlet 53 of the warming jacket 48 also communicates with the reservoir through a conduit 54.

While the construction and operation of the heat exchange unit, per se, forms no part of the present invention, its inclusion in the combination or system diagrammatically disclosed in Fig. 1 is a part of the present invention. Therefore, a brief description of the operation of the heat exchange unit is deemed necessary in order to fully explain the entire system and/or the by-pass control valve shown in detail in Fig. 2 of the drawing.

Accordingly, the heat exchange unit and parts thereof, not shown in detail, but generally described, functions as follows.

A heat exchange unit of the type described is disposed in the lubricant circulating system between the reservoir and the scavenge pump so that the oil from the engine will be forced through the unit and thence into the reservoir. Assuming that the engine is put in operation from a cold start and that the oil in the radiator 47 is viscous or congealed, same will enter the unit at 44, where it will then be by-passed through valve 49, warming jacket 48, outlet 53 and through conduit 54 into the reservoir.

However, as the viscosity of the oil in the radiator 47 lowers under the influence of the heat transfered thereto from the warming jacket, the valve 49 will close and the valve 50 will open so that the oil entering inlet 44 will follow a path through the radiator 48, outlet 51 conduit 52, and thus into the reservoir 39. This latter circuit or flow path will be maintained so long as the viscosity of the oil is at a point where the latter will readily flow at a predetermined pressure.

Referring to the operation of the entire lubrication system with the by-pass control valve included therein ahead of the heat exchange unit, as shown diagrammatically in Fig. 1, if the engine is put in operation with the oil in the system and radiator 47 either congealed or in a highly viscous state, the oil from the engine is forced under pressure by the scavenge pump (not shown) through conduit 41 and inlet 2 of the by-pass control valve.

The oil under pressure entering the by-pass control valve body through inlet 2, acts in a downward direction on the top of valve 28 and exerts a force tending to hold the valve 28 tightly closed, such downward force acting in conjunction with and augmenting the biasing effect of the spring 36. At the same time the oil under pressure entering through the inlet 2 acts in an upward direction against the under side of the valve 37 slidably mounted on the stem or rod 20 and tends to open such valve against the biasing resistance of the spring 38 to thereby permit oil to flow through the by-pass port 6 and conduit 42 to the reservoir 39. As pressure of the oil in the inlet 2 increases by reason of continued operation of the scavenge pump to a value greater than the resistance value of the spring 38 the valve 37 will be moved upwardly to open position. The resistance value of the spring 38 may be varied in accordance with that inlet pressure at which it is desired to have the valve 37 open.

The resistance value of the spring 38 creates and determines the pressure differential between the oil in the inlet 2 and the oil in the by-pass outlet 6 with the pressure being less on the outlet side of the valve port 7 than on the inlet side thereof. Assuming the inlet pressure to be greater than the resistance value of the spring 38 and the valve 37 open, oil flowing from the inlet 2 to the by-pass outlet 6 will flow through the conduit 42 to the tank 39 forcing any congealed oil out of the line 42, and oil pressure in the by-pass outlet 6 created by resistance to flow of oil through the conduit 42 will be effective through the vertical passages 13 and transverse grooves 19 on the top of the piston in the cylinder 17. Such latter pressure augments the biasing effect of the spring 36 and the oil inlet pressure on the top of valve 28 to hold such valve 28 closed, thereby preventing flow of the oil through the outlet 3 of the by-pass valve to the heat exchange unit 46 and protecting the heat exchange unit from damage resulting from high pressures which might otherwise escape through the main outlet 3 of the by-pass control valve.

Oil under pressure in the inlet 2 of the by-pass valve, simultaneously with its effect on the upper side of the valve 28 and the lower side of the valve 37, enters the screened opening 26 to the friction tube 25 in the stem or rod 20 and moves through the friction tube and the openings 27 to the under side of the piston in the cylinder 17 to exert upward force on the piston. The friction tube 25 acts to delay the exertion of full inlet pressure on the under side of the piston in the cylinder 17 until at least sufficient inlet pressure has been built up to open the valve 37 and thereby permit oil pressure in the by-pass outlet 6 to become effective on the upper side of the piston in the cylinder 17 for augmenting the biasing effect of the spring 36 and the effect of the inlet pressure on the top of valve 28 to hold such valve 28 closed. Further time delay in opening of the valve 28 is provided for by the space between the lower side of valve 28 and the nut 29 so that initial upward movement of the piston in the cylinder 17, which is against only the biasing effect of the spring 36 serves only to move the nut 29 upwardly against the under side of valve 28 and set the parts for opening of the valve 28 by further upward movement of the piston which, when the parts are in set position as just described and the valve 37 open, is resisted by the biasing effect of the spring 36, the effect of the inlet pressure on the upper side of the valve 28 and the effect of the by-pass pressure on the upper side of the piston. The resistance value of the spring 36, as well as the areas of the piston and the valve 28 are such that with any appreciable pressure in the by-pass the sum of their resistance to opening of the valve 28 will be greater than the opening effect of inlet pressure on the under side of the piston in the cylinder 17.

As the temperature of the oil flowing through the by-pass valve rises due to heat imparted to the oil by the engine, the viscosity thereof and the resistance to flow through the line 42 decrease accordingly. At the same time the inlet pressure will likewise decrease, although there will be a pressure differential between the inlet and by-pass equal to the resistance of the spring 38 to opening of the valve 37. As the pressure in the by-pass 6 becomes lower, the effect of such by-pass pressure on the top of the piston in the cylinder 17 likewise becomes less until the combined effect of such by-pass pressure, the spring 36 and inlet pressure on the upper side of valve 28 is less than the upward effect of the inlet pressure on the under side of the piston in the cylinder 17 whereupon such piston will be moved upwardly to lift the valve 28 from its seat and open the outlet 3 to the heat exchange unit 46. The parts are so arranged and so operate that the valve 28 will not be lifted from its seat until the inlet pressure is less than a predetermined value which will not have a destructive effect on the heat exchange unit, and after such valve 28 is opened the pressure to which the heat exchange unit may be subjected is limited by the resistance value of the spring 38 to opening of the valve 37 controlling flow to the tank 39 through the by-pass outlet 6 and the conduit 42.

The temperature of the oil in the system will continue to rise under the effect of the heat imparted to it by the engine and the viscosity of such oil will become correspondingly lower. Pressure necessary to flow the oil through the heat exchange unit 46 is less than that necessary to open the valve 37 against resistance of the spring 38, whereby the inlet pressure will continue to decrease due to lesser resistance to flow and the valve 37 will be moved to closed position. However, the compression value of the spring 36 is such that it will be overcome by even the lesser inlet pressure whereby the valve 28 will be held open by the effect of the inlet pressure on the under side of the piston in the cylinder 17 until the engine and scavenge pump cease to operate. Then, the spring 36 will move the valve 28 to closed position and upon again starting the engine the foregoing cycle of operations will be repeated.

To summarize, it will be readily apparent from the foregoing that regardless of the type of heat exchange unit used in the lubricating system the by-pass control valve and/or the combination thereof in a lubricant circulatory system, will automatically function to prevent the application of damaging pressure to the heat exchange unit or other part to be protected.

It is to be understood that the form of my invention herewith shown and described, is to be taken as only one example of the same, and that various changes in the shape, size and arrangement of parts may be resorted to without departing from the spirit of my invention or the scope of the subjoined claims.

What is claimed is:

1. A by-pass fluid control device including a casing having an inlet, an outlet, a by-pass, and a passage interconnecting the inlet, outlet and by-pass, a cylinder having a closed bottom, disposed between the by-pass and inlet and having the upper portion of its interior in communication with said by-pass passage, a spring-tensioned piston slidable in the cylinder, a sleeve secured to and depending from the closed bottom of the cylinder, a tubular stem secured to the piston and slidable within the sleeve and having its interior in communication with the cylinder below the piston and with the part of the passage between the inlet and by-pass, a spring tensioned valve slidable on the sleeve controlling communication between the inlet and by-pass, a second valve slidable on the stem of the piston for controlling communication between the inlet and outlet, means operable by the piston stem for normally holding the second valve in closed position, and means operable by the piston stem to open the second-named valve.

2. A fluid flow control device including a casing having an inlet, an outlet and a by-pass all of which are interconnected, tensioned control means normally held in closed position between the inlet and by-pass responsive to fluid pressure to permit flow through the by-pass when the inlet fluid pressure reaches a predetermined value and to prevent flow through the by-pass when the inlet fluid pressure is less than said predetermined value, a second normally closed fluid pressure responsive control means disposed between the inlet and the outlet, tensioned means for effecting closing of the second control means, the tension of which is less than that to which the first control means is subjected, and means to conduct fluid pressure from the by-pass to the second control means to augment the tension to which same is subjected, and means to conduct fluid pressure in the inlet to said second control means in opposition to the fluid pressure from said by-pass, said last named means including a device for slowing the rate of flow of pressure fluid to said second control means.

3. A fluid flow control device including a casing having an inlet, an outlet, and a by-pass, all of which are interconnected, a valve normally biased to closed position between the inlet and by-pass effective to create a differential pressure between the inlet and by-pass and to open when the pressure in the inlet is increased beyond a predetermined degree, a second valve between the inlet and outlet, a combined biasing and pressure responsive means associated with the second valve to temporarily hold the same closed when the pressure in the inlet is increased beyond said predetermined degree, said pressure responsive means of the second valve being responsive to the inlet pressure and to the differential in pressure between the inlet and the by-pass so as to open the second valve and to permit the first valve to close under the influence of its biasing means.

4. A flow control device for a fluid the viscosity of which varies in accordance with changes in temperature including a casing having an inlet, an outlet and a by-pass, all of which are interconnected, a valve normally biased to closed position between the inlet and the outlet, means for creating a differential between inlet and by-pass pressure, and means associated with said valve and responsive to the pressures in the inlet and in the by-pass to open such valve when the pressure in the by-pass drops below a predetermined value.

5. A flow control device for a fluid the viscosity of which varies in accordance with changes in temperature including a casing having an inlet, an outlet and a by-pass, all of which are interconnected, a valve normally biased to closed position between the inlet and the outlet, means for creating a differential between inlet and by-pass pressure, and means associated with said valve and responsive to the pressures in the inlet and in the by-pass to initially maintain such valve closed and then to open such valve when the pressures of the inlet and by-pass drop to predetermined values.

6. A valve for use with a lubricant circulatory system wherein lubricant is circulated under pressure and subjected to heat, and having a source of pressure and a heat exchange unit, including a body having an inlet leading from the source of pressure, an outlet leading to the heat exchange unit, and a by-pass, all of which are interconnected, valve means disposed between the inlet and the outlet normally biased to closed position and responsive to the lubricant pressure in the system, and means additional to the normal biasing means and associated with said valve effective to maintain said valve in closed position until the lubricant pressure at the inlet of the device decreases to a predetermined value.

7. A fluid flow control device including a casing having an inlet, an outlet and a by-pass, all of which are interconnected, a valve normally biased to closed position between the inlet and the outlet, and means associated with said valve and responsive to the pressures in the inlet and the by-pass to open said valve when said pressures decrease to predetermined values.

8. A fluid flow control device for use in a fluid circulatory system wherein a fluid, the viscosity of which varies with changes in temperature, is circulated under pressure, including a casing having an inlet, an outlet and a by-pass, all of which are interconnected, a valve normally biased to closed position between the inlet and the outlet of the device and arranged to be moved toward closed position by the pressure of the fluid at said inlet, and means associated with said valve and responsive to a decreasing pressure in the inlet to open said valve when the inlet pressure drops below a predetermined value.

9. A fluid flow control device including a casing having an inlet, an outlet and a by-pass, all of which are interconnected, a valve normally biased to closed position between the inlet and the outlet and arranged to be moved toward closed position by the pressure of the fluid at said inlet, and means associated with said valve and responsive to a decreasing pressure in the inlet to open said valve when the inlet pressure drops to a predetermined value.

10. A fluid flow control device including a casing having an inlet, an outlet and a by-pass, all of which are interconnected, means for creating a pressure differential between the inlet and the by-pass, a valve normally biased to closed position between the inlet and the outlet, and means associated with said valve and responsive to the pressure differential between the inlet and the by-pass and a decreasing pressure in the inlet to open said valve when the inlet pressure drops to a predetermined value.

11. A fluid flow control device including a casing having an inlet, an outlet and a by-pass all of which are interconnected, a valve normally biased to closed position between the inlet and by-pass and effective to create a differential between inlet and by-pass pressure, said valve being adapted to open when such pressure differential between inlet and by-pass exceeds a predetermined value and to close when such pressure differential between inlet and by-pass drops below said predetermined value, a second fluid pressure responsive valve disposed between the inlet and outlet normally biased to closed position, and means associated with said second valve and responsive to decreasing pressures in the inlet and in the by-pass so as to open the latter valve when said pressures drop to predetermined values.

12. A fluid flow control device including a casing having an inlet, an outlet and a by-pass all of which are interconnected, control means normally biased to closed position between the inlet and by-pass and effective to create a differential between inlet and by-pass pressure, said control means being adapted to open when such pressure differential between inlet and by-pass exceeds a predetermined value, and second fluid pressure responsive control means disposed between the inlet and outlet normally biased to closed position and effective to permit flow through the outlet when the inlet and by-pass pressures drop to or below predetermined values.

13. A fluid flow device for fluids, the viscosity of which varies with temperature change, including a casing having an inlet, an outlet and a by-pass all of which are interconnected, control means normally biased to closed position between the inlet and by-pass and effective to create a differential between inlet and by-pass pressure, said control means being adapted to permit flow through the by-pass when the pressure differential between the inlet and by-pass reaches a predetermined value and to prevent flow through the by-pass when the pressure differential between inlet and by-pass is below said predetermined value, second fluid pressure responsive control means disposed between the inlet and outlet and normally biased to closed position, and means associated with the last named control means responsive to the pressures in the inlet and the by-pass and effective to operate said second control means whereby to permit flow of fluid through the outlet when the pressures in said inlet and by-pass drop to predetermined values.

14. A fluid flow control device of the character described including a casing having an inlet for connection to a scavenge pump, an outlet for connection to a heat exchanger and a by-pass outlet for connection to a reservoir, the inlet, outlet and by-pass being interconnected for the passage of fluid therethrough, a valve normally biased to closed position between the inlet and by-pass and effective to create a differential between inlet and by-pass pressure, a second fluid pressure operated valve disposed between the inlet and outlet and normally biased to closed position, and means associated with said second valve and responsive to the pressures in the inlet and the by-pass so as to open the latter valve and permit the first valve to close when the pressures in said inlet and by-pass drop to predetermined values.

15. A fluid flow control device for use in the surge protection of elements of an engine lubrication system or the like, comprising a housing having inlet, outlet and by-pass ports, all interconnected; a valve intermediate said inlet and outlet movable to open and closed positions with respect to said outlet and arranged to be operated by the pressure of the fluid entering said inlet in a direction to close said outlet, the inlet pressure varying from a zero value at the start of engine operation to a surge value exceeding normal operating pressure values; a valve lifting mechanism for moving said valve from closed to open position; said mechanism exerting a force on said valve predetermined to maintain said valve open within a range of inlet pressures representing normal operating values; and means interposing a time delay in the action of said valve lift mechanism preventing operation thereof until after the initial establishment of normal operating pressure at said inlet.

16. A fluid flow control device for use in the surge protection of elements of a lubrication system or the like, comprising a housing having an inlet, an outlet and a by-pass, all interconnected, the fluid entering said inlet at a variable pressure and flowing alternatively to said outlet and said by-pass; means for establishing a differential between the fluid pressures at said inlet and said by-pass; a valve movable to open and closed positions with respect to said outlet, said valve being pressed by incoming pressure fluid at said inlet toward closed position; a pressure fluid responsive piston for lifting said valve to open position; means for applying pressure fluid from said by-pass to said piston in a direction opposing operation thereof; means for applying pressure fluid from said inlet to said piston in a direction effecting operation thereof; a lost motion connection between said piston and said valve; and means slowing the rate of flow of pressure fluid from said inlet to said piston.

17. A fluid flow control device including a casing having an inlet for connection to a scavenge pump, an outlet for connection to a heat exchanger, a by-pass for connection to a reservoir and a passage interconnecting the inlet, outlet and by-pass, means for controlling that part of the passage between the inlet and by-pass, means operable by the fluid pressure for closing the outlet, means for opening said outlet closing means having a tensioned device, means for conducting fluid pressure to the device of the outlet closing means from a point on the by-pass side of said by-pass controlling means, and means for conducting fluid pressure to the device of the outlet closing means from a point on the inlet side of said by-pass controlling means, whereby to create a pressure differential for controlling operation of said device, and delay means for regulating the conduction of fluid pressure to the inlet side of the device.

18. A fluid flow control device for use in the surge protection of elements of an engine lubrication system or the like, the pressure in said system having normal operating values and having also surge values as those developed by a cold engine start; said control device having an inlet, an outlet and a by-pass, all interconnected;

first and second valves respectively arranged between said inlet and said by-pass and between said inlet and said outlet, said valves being normally closed with said first valve closing in a direction contrary to the direction of fluid flow, and said second valve closing in the direction of fluid flow, said first valve opening under rising initial pressures at said inlet while said second valve is held closed thereby; and means responsive to a decreasing pressure at said inlet for opening said second valve.

19. A fluid flow control device for use in the surge protection of elements of an engine lubrication system or the like, the pressure in said system having normal operating values and having also surge values as those developed by a cold engine start; said control device having an inlet, an outlet and a by-pass, all interconnected; first and second pressure responsive valves respectively arranged between said inlet and said by-pass and between said inlet and said outlet, said valves being normally closed; and control means for said valves permitting said first valve to open as the pressures at said inlet rise toward a surge value and permitting said second valve to open as the pressures at said inlet decrease from a surge value.

20. A fluid flow control device for use in the surge protection of elements of an engine lubrication system or the like, the pressure in said system having normal operating values and having also surge values as those developed by a cold engine start; said control device having an inlet, an outlet and a by-pass, all interconnected; a valve for closing said outlet, said valve being urged to closed position by the pressure of the fluid at the inlet; means for establishing a pressure differential between said inlet and said by-pass; and means utilizing said pressure differential to apply a substantially constant force to said valve in a direction to open said valve, said constant force being opposed to the force of inlet pressure acting directly on said valve and said forces being so proportioned as to maintain said valve closed while the inlet pressure attains surge values and to open said valve when said inlet pressure decreases from a surge value to a predetermined normal operating value.

HAROLD CRUZAN.